United States Patent
Chen et al.

(10) Patent No.: US 9,185,455 B2
(45) Date of Patent: Nov. 10, 2015

(54) METHOD AND APPARATUS FOR USING 802.11 WLANS IN TV WHITE SPACE

(75) Inventors: Hou-Shin Chen, Cincinnati, OH (US); Wen Gao, West Windor, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 56 days.

(21) Appl. No.: 13/577,663

(22) PCT Filed: Feb. 16, 2011

(86) PCT No.: PCT/US2011/000286
§ 371 (c)(1),
(2), (4) Date: Aug. 8, 2012

(87) PCT Pub. No.: WO2011/102897
PCT Pub. Date: Aug. 25, 2011

(65) Prior Publication Data
US 2012/0307817 A1    Dec. 6, 2012

Related U.S. Application Data

(60) Provisional application No. 61/338,302, filed on Feb. 16, 2010, provisional application No. 61/308,902, filed on Feb. 27, 2010.

(51) Int. Cl.
*H04W 4/00* (2009.01)
*H04N 21/438* (2011.01)
*H04N 21/2381* (2011.01)
*H04N 21/2383* (2011.01)
*H04N 21/2385* (2011.01)
(Continued)

(52) U.S. Cl.
CPC ....... *H04N 21/4382* (2013.01); *H04N 21/2381* (2013.01); *H04N 21/2383* (2013.01); *H04N 21/2385* (2013.01); *H04N 21/43637* (2013.01); *H04N 21/440218* (2013.01)

(58) Field of Classification Search
USPC .................................................. 370/338, 329
See application file for complete search history.

(56) References Cited

U.S. PATENT DOCUMENTS

| 7,321,762 B2 | 1/2008 | Hoeben | |
|---|---|---|---|
| 2010/0173586 A1* | 7/2010 | McHenry et al. | 455/62 |
| 2010/0175101 A1* | 7/2010 | Devictor et al. | 725/131 |

(Continued)

OTHER PUBLICATIONS

IEEE, Part 11: Wireless LAN Medium Access Control (MAC) and Physical Layer (PHY) Specifications, 2013, Amendment 5, all.*

(Continued)

*Primary Examiner* — Omar Ghowrwal
*Assistant Examiner* — Angel Brockman
(74) *Attorney, Agent, or Firm* — Robert D. Shedd; Ronald J. Kolczynski

(57) ABSTRACT

A method and apparatus for using 802.11 Wireless LANs in TV white space are provided that additionally allows coexistence with non-802.11 devices in the same spectrum space. The method and apparatus extend concepts used in traditional 802.11 applications in the MAC and PHY layers so that WLANs can function over TV white space channels. The method and apparatus also facilitates coexistence of non 802.11 devices and existence with other 802.11 applications by extending the Enhanced Distributed Channel Access mechanism used to provide quality of service. An OFDM system with fixed subcarrier spacing is suggested to accommodate spectrum characteristics (variable center frequency and channel bandwidth) of the TVWS.

12 Claims, 5 Drawing Sheets

(51) Int. Cl.
*H04N 21/4363* (2011.01)
*H04N 21/4402* (2011.01)

(56) References Cited

U.S. PATENT DOCUMENTS

2010/0195580 A1* 8/2010 Samarasooriya et al. .... 370/329
2010/0227622 A1* 9/2010 Mody et al. ................ 455/452.1
2012/0184283 A1* 7/2012 Mueck ...................... 455/452.1

OTHER PUBLICATIONS

IEEE Part 11: Wireless LAN Medium Access Control (MAC) and Physical Layer (PHY) Specifications: Enhancements for Higher ThroughPut, 2009, Amendment 5, all.*
IEEE, Part 11: Wireless LAN Medium Access Control (MAC) and Physical Layer (PHY) Specifications: Prioritization of Management Frames, 2012, Amendment 1, all.*
McHenry et al., "Determination of Detection Thresholds to Allow Safe Operation of Televison Band "White Space" Devices,"Oct. 14-17, 2008, INSPEC 10311224, 12 pages.
Luo et al., "Achieving Temporal Fairness in Multi-Rate 802.11 WLANs with Capture Effect," Reviewed by IEEE Communications Society for publication in ICC 2008 proceedings, pp. 2496-2501.
Ahuja et al., "Cognitive Radio System using IEEE 802.11a over UHF TVWS," Motorola Inc., 2008 IEEE, pp. 1-9.
Minden et al., "Cognitive Radios for Dynamic Spectrum Access—An Agile Radio for Wireless Innovation," IEEE Communications Magazine, IEEE Service Center, US, vol. 44, No. 5, May 1, 2007, pp. 113-121.
Nekovee, M. et al., "A Survey of Cognitive Radio Access to TV White Spaces," Int'l. Conference on Ultra Modern Telecommunications & Workshops, 2009, ICUMT '09, IEEE, USA, Oct. 12, 2009, pp. 1-8.
Klalona, "IEEE P802.22 Wireless RANs, Nextwave Broadband WRAN Proposal Outline," IEEE, USA, Nov. 7, 2005, 19 pgs.
Rajbanshi et al., "An Efficient Implementation of NC-OFDM Transceivers for Cognitive Radios," 1st International Conference on Cognitive Radio Oriented Wireless Networks and Communications, IEEE, Pl, Jun. 1, 2006, pp. 1-5.
Tinnirello et al., "Temporal Fairness Provisioning in Multi-Rate Contention-Based 802.11e WLANs," Proceedings of the 6th IEEE Int'l. Symposium on a World of Wireless Mobile and Multimedia Networks (WoWMOM'05), IEEE 2005, 10 pages.
Search Report Dated Jul. 28, 2011.

* cited by examiner (a) 802.11 PPDU frame format (b) 802.11 TVWS PPDU frame format Transmit Order

METHOD AND APPARATUS FOR USING 802.11 WLANS IN TV WHITE SPACE

CROSS-REFERENCE TO RELATED APPLICATIONS

This application claims the benefit, under 35 U.S.C. §365 of international Application PCT/US2011/000286, filed Feb. 16, 2011, which was published in accordance with PCT Article 21(2) on Aug. 25, 2011 in English and which claims the benefit of U.S. provisional patent application No. 61/338,302, filed Feb. 16, 2010 and U.S. provisional patent application No. 61/308,902, filed Feb. 27, 2010.

FIELD OF THE INVENTION

The present principles relate to a method and apparatus for using 802.11 WLANs in TV white space that uses unoccupied television spectrum.

BACKGROUND OF THE INVENTION

Recently, the Federal Communications Commission (FCC) has approved the operation of unlicensed radio transmitters in the broadcast television spectrum at locations where that spectrum is not being used by licensed services, such as television stations and wireless microphone operators, under certain rules. This unused TV spectrum is often termed "white spaces". A concept called Cognitive Radio was proposed to implement negotiated, or opportunistic, spectrum sharing to improve spectrum efficiency for these frequencies.

It can be expected that the implementation of Cognitive Radio (CR) in TV white space will be a major topic within wireless communication into the future and provide a viable solution to the problem of scarcity of the wireless spectrum. In 2004, based on the expectation of unlicensed use of TV white space, under the charter of an IEEE 802 Standards Committee, a working group named IEEE 802.22 was established to develop a standard for a Cognitive Radio-based PHY/MAC/air interface for use by license-exempt devices on a non-interfering basis in spectrum that has already been allocated to the TV Broadcast Service. The IEEE 802.22 working group is also called the WRAN, since it is essentially developing an air interface for a Wireless Regional Area Network (WRAN) with a range as large as 30 miles.

An alternative idea is to standardize the use of this spectrum to provide services similar to that of the traditional IEEE 802.11 WiFi standard. This effort to use TV white space for WiFi access is known as 802.11af. The difference between the traditional 802.11 standards and 802.11of is that 802.11 of will be for WiFi operation in the TV white spaces.

TV white space (TVWS) consists of fragments of TV channels. Thus, depending on the usage of TV broadcasting and wireless microphones, the spectrum opportunity may be 6 MHz, 12 MHz, 18 MHz, . . . assuming that a TV channel is 6 MHz wide. In addition, the spectrum opportunity may happen in any of the TV bands. Thus, the spectrum opportunity in TVWS differs from the traditional 802.11 bands of 2.4 GHz, 3.6 GHz and 5 GHz in that the center frequency and channel bandwidth are variable. In addition, self-coexistence of 802.11 systems as well as coexistence of 802.11 and other 802 and non-802 wireless systems needs to be rigorously considered. Under the present principles, necessary modifications of the current IEEE 802.11 Standard for WLAN use in TVWS are described according to the characteristics of TVWS.

SUMMARY OF THE INVENTION

These and other requirements necessary to use WLANs in TV white space are addressed by the present principles, which are directed to a method and apparatus for using 802.11 in TV white space devices. Using the principles described herein, extensions and modifications of the current IEEE 802.11 WLAN Standard for use in the TV white space (TVWS) are proposed for both MAC and PHY layers. The Enhanced Distributed Channel Access (EDCA) mechanism used to provide quality of service (QoS) is extended to facilitate coexistence of heterogeneous systems in TVWS. An OFDM system with fixed subcarrier spacing is suggested to accommodate spectrum characteristics (variable center frequency and channel bandwidth) of the TVWS.

According to an aspect of the present principles, there is provided a method for generating a TV white space signal. The method comprises formatting of data with medium access control (MAC) and physical layer (PHY) parameters into a format suitable for use with 802.11 applications. The method further comprises transmission of this formatted data using orthogonal frequency division multiplexing with fixed subcarrier spacing. The method also comprises insertion of virtual carriers into unused TV channels when the white space that is used is comprised of multiple non-contiguous TV channels.

According to another aspect of the present principles, there is provided an apparatus for generating a TV white space signal. The apparatus is comprised of a data formatter that formats data together with medium access control and physical layer parameters into information that is to be transmitted. The apparatus is further comprised of a modulator that inserts virtual carriers into unused TV channels when there are multiple non-contiguous TV white space channels needed to transmit the information. The apparatus is further comprised of a transmitter that transmits the formatted information from the data formatter using orthogonal frequency division multiplexing (OFDM) with fixed subcarrier spacing. The transmitter also passes along the virtual carriers inserted by the modulator.

These and other aspects, features and advantages of the present principles will become apparent from the following detailed description of exemplary embodiments, which is to be read in connection with the accompanying drawings.

DETAILED DESCRIPTION

Recently, based on the approval of FCC, unlicensed radio transmitters can utilize the broadcast television spectrum at locations where that spectrum is not being used by licensed services, according to IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications," IEEE, New York, N.Y., June 2007. This unused TV spectrum is often termed "TV white space". Several IEEE standard groups have been thinking how to use this non-licensed spectrum. Among these groups, IEEE 802.11af group is significant because there are already tremendous 802.11 devices in the market. The 802.11 of group is standardizing use of TV white spaces for services traditionally provided by the 802.11 WLAN standard. Under the principles described herein, we describe several ideas regarding extensions of current IEEE 802.11 WLAN Standard for use in the TV white space (TVWS) and so that 802.11 of devices can exist with non-802.11 of devices in this space. Under these principles, WLAN devices can operate in the TV white space bands and coexist with non-TVWS devices. Typical WLAN devices operate within a localized wireless network area, but are capable of communication over a wide area network.

The fundamental access method of the IEEE 802.11 Medium Access Control (MAC) is a Distributed Coordination Function (DCF) known as Carrier Sense Multiple Access with Collision Avoidance (CSMA/CA). It is a distributed system while most of other systems such as IEEE 802.16 and IEEE 802.22 are centralized systems. As a result, it is difficult to design "a common MAC (coexistence scheme)" for 802.11 and other 802 wireless systems. The coexistence of heterogeneous systems can be achieved by a centralized control machine or through distributed resource contention method. Both have advantages and disadvantages. For a centralized coexistence mechanism, synchronizations of various IEEE and non-IEEE wireless systems over a wide area is a crucial control problem. Thus, we suggest extending the existing IEEE 802.11 MAC to facilitate the coexistence problem.

Figure 1:
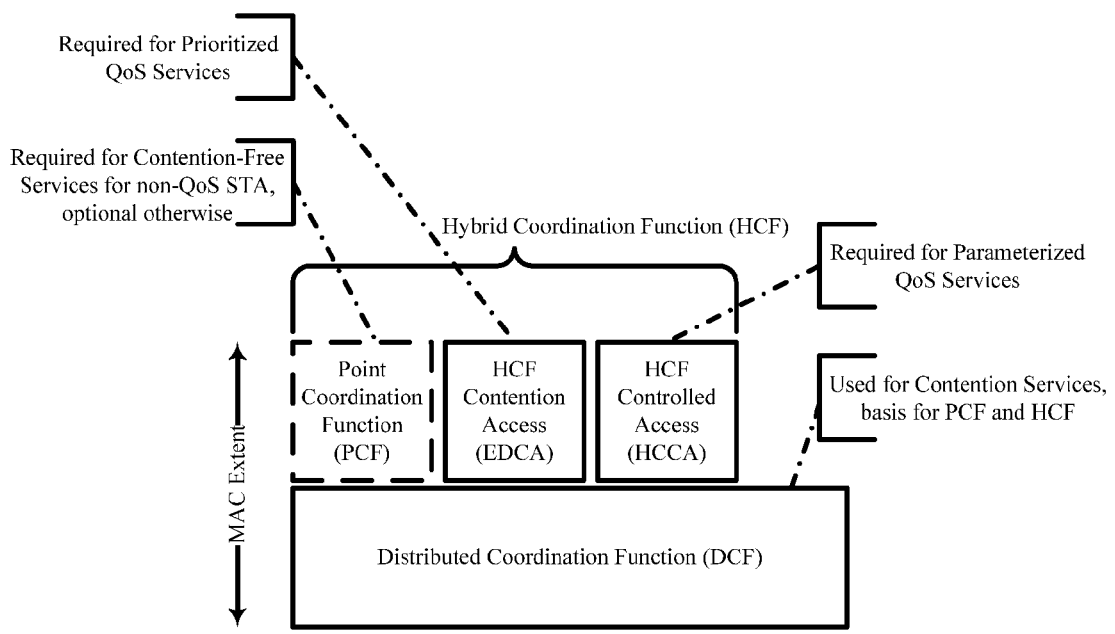
FIG. 1 shows the IEEE 802.11 MAC architecture.

The basic idea is that every system employs Distributed Coordination Function (DCF) with enhanced distributed channel access (EDCA) mechanism to compete for wireless medium. FIG. 1 (from IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications," IEEE, New York, N.Y., June 2007) illustrates the IEEE 802.11 MAC architecture. The basic MAC rule is DCF and Hybrid Coordination Function (HCF) is provided through the services of the DCF to support QoS. The Point Coordination Function (PCF) is a centralized mechanism and it is seldom used. The HCF uses both a contention-based channel access method, called the EDCA mechanism for contention-based transfer, and a controlled channel access, referred to as the HCF controlled channel access (HCCA) mechanism, for contention-free transfer. We will focus on the EDCA mechanism.

The EDCA mechanism provides differentiated, distributed access to the wireless media for stations (STAs) using eight different user priorities (UPs). It defines four access categories (ACs) that provide support for the delivery of traffic with UPs at the STAs. The four ACs and their corresponding parameters are listed in Table 1. In Table 1, TXOP refers to transmission opportunity. It is the time that a station has the right to transmit on the channel, limited by TXOPLimit. An initiation of the TXOP occurs when a STA obtains access to the medium through DCF. Multiple frames may be transmitted in an acquired TXOP if there is more than one frame pending in the AC for which the channel has been acquired. However, those frames that are pending in other ACs shall not be transmitted in this TXOP.

The EDCA mechanism is suitable to facilitate a coexistence problem. Every system acquires the wireless medium for a period of time through DCF. Table 2 lists the proposed extension of EDCA mechanism for TVWS using the present principles. First, an optional AC called Sensing is added for spectrum sensing and it has the highest priority. The TXOP limit for the Sensing AC is chosen, for example, to be 10 ms. The selection of a quiet period depends on the practical application. Different service may have different requirement for transmission delay and hence different quiet period. Furthermore, the TXOP limit for the AC of Best Effort is modified to be 5 ms. Most of the existing 802.11 systems use DCF as their MAC function. Every STA will have equal channel access opportunity. When a STA gets a chance to use the wireless medium, it can transmit a frame. The size of a frame depends on the data rate used by this STA. A frame of an STA with low data rate is longer. Consequently, low-rate transmissions will consume more channel time. Thus, 802.11 systems with DCF are throughput-based fair. This leads to bandwidth under-utilization in WLANs, as pointed out in several references. The EDCA mechanism is designed to provide QoS for video and voice service. The problem of bandwidth under-utilization still exists for data transmissions other than video and voice. Thus, we suggest having a nonzero TXOP limit for the AC of Best Effort. By doing so, the inherent throughput-fairness 802.11 systems can become temporal-fairness systems and the total throughput will increase. The TXOPLimits in Table 2 are redesigned according to a 6 MHz channel with 64 subcarriers. To achieve temporal fairness, the frame number of each transmission should be proportional to the data rate. We choose the TXOPLimit of the Best Effort AC to be the same as that of the Video AC so that the largest flexibility is provided.

When different systems have to coexist and 802.11 systems are involved, the non-802.11 systems employ the DCF and EDCA mechanism to acquire wireless medium. Table 3 lists two ACs for non-802 systems. The Coex AC is used to contend resources and the optional Sensing AC is used for spectrum sensing. The parameters for the Coex AC are shown as an example. Their values can be modified based on the coexistence scenarios, such as the services and the technologies used by different networks that coexist. Whether the optional Sensing AC is performed depends on the incumbent protection scheme. If the incumbent protection is completely performed by a database, there is no need to perform sensing. The parameters of the Coex AC should be designed to achieve time-fairness of all systems.

The IEEE 802.11 standards use several PHY techniques including Direct Sequence Spread Spectrum (DSSS), Frequency Hopping Spread Spectrum (FHSS) and Orthogonal Frequency Division Multiplexing (OFDM). DSSS and FHSS are used to combat interferences in 2.4 GHz ISM bands due to other systems. It is expected that radio transmissions in TVWS will be non-interference based. Therefore, there is no need to use spread spectrum techniques and OFDM PHY shall be used. Our proposed PHY protocol for 802.11 TVWS is based on 802.11a and 802.11n OFDM PHY. Modifications are made to accommodate spectrum properties of the TVWS.
1. Use Multiple Available TV Channels:

Based on the FCC Second Report and Order of November 2008, TV channels 2-51 except channels 3, 4 and 37, can be used for radio transmissions provided that the incumbent licensed signals, i.e., TV broadcast and wireless microphone (WM) signals, are not interfered. Thus, the spectrum opportunity in TVWS consists of fragments of single or multiple TV channels (TVCs). The size of the each fragment can vary from 1 TVC to several TVCs. It has been shown that even in urban areas, a fragment can have as many as four contiguous TVCs. In rural areas, fragments of up to 16 TVCs are possible. Basically, more channel bandwidth means higher data rate and smaller data packet sizes. Having a small data frame is important for a CSMA system. Thus, we suggest that 802.11 of should support variable channel bandwidth. For contiguous available TVCs, using multiple TVCs together can also improve the spectrum efficiency because there is no need to have guard bands between TVCs.

The spectrum opportunities in TVWS can be classified into two categories, which are contiguous and non-contiguous.

In the first case, the available TVCs are contiguous. For example, four contiguous TVCs are available in FIG. 2(a). Ideally, the larger the channel bandwidth, the higher the data rate, so from this point of view, a system should use as many available TVCs as possible. Obviously, a practical system cannot support an infinite number of channel bandwidths. We propose that 802.11 of systems support a single TVC and 2, 3, 4, 8, 16 contiguous TVCs. In urban areas, 2, 3 and 4 contiguous TVCs can be available with high probability. The 8 and 16 TVC cases are provided mainly for rural areas.

Figure 2:
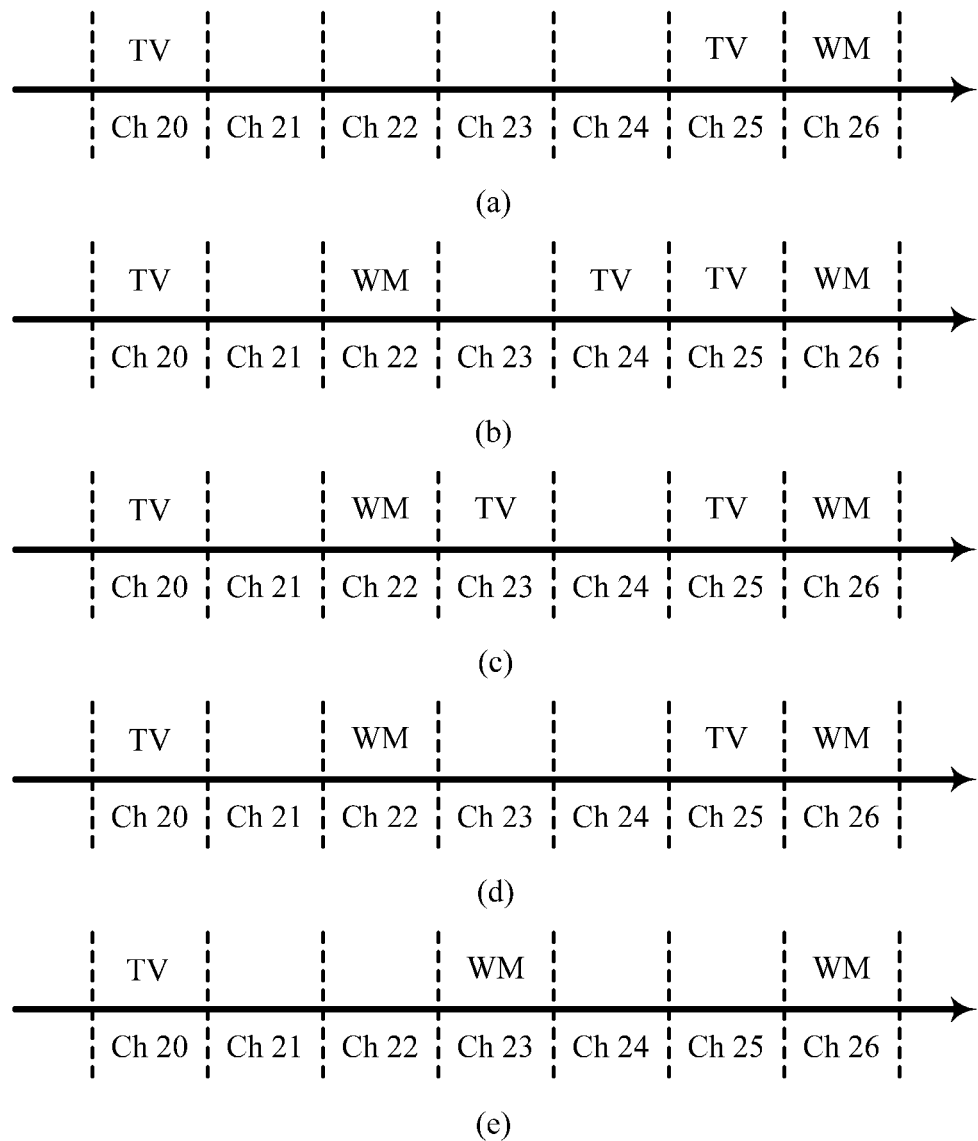
FIG. 2 shows an example of TV white space usage.

In the second case, the available TVCs are non-contiguous. When the available TVCs are not contiguous but close to each other, we still want to use them together to increase data rate and have small packet sizes. The CSMA-based systems compete for the medium in the time domain. Different systems see each other as long as the TVCs used are overlapped. The transmission delay performance of the whole system is improved by having small packet size. This is one reason to have small packet sizes. In FIG. 2(b), channel 21 and 23 are available. When these two TVCs are used together, because any radio transmission in the TV spectrum has to follow the spectrum mask specified by the FCC, multiple filter operations are required, as explained below. Generally speaking, using non-contiguous TVCs together will increase complexity in both the transmitter side and the receiver side. Thus, a constraint should be specified. We propose that the channel separation for non-contiguous TVCs should not be more than 2 TVCs. For example, in FIG. 2(c), Ch21 and Ch24 can be used together by putting virtual subcarriers in Ch22 and Ch23. Virtual subcarriers in an OFDM system are unused carriers, ie., no data is transmitted on these carriers, and are located near the edge of an assigned band to suppress adjacent channel interference. Similarly, in FIG. 2(d), Ch21, Ch23 and Ch24 can be used together by putting virtual subcarriers in Ch22. However, in FIG. 2(e), Ch21, Ch22, Ch24 and Ch25 cannot be used together because Ch21 and Ch25 are separated by three channels.

As mentioned above, for any radio transmissions in TV bands, their out of band emission should obey an emission mask specified by the FCC. Even when some virtual subcarriers are put in the channel edges, an interference elimination filter (IEF) is still required. In order to use variable contiguous TV channels, TVWS devices need to embed IEFs with different bandwidths. For example, if TVWS devices support 1 to 4 contiguous TV channels, they need to have IEFs with bandwidths of 6 MHz, 12 MHz, 18 MHz and 24 MHz. For non-contiguous cases, combinations of IEFs of different bandwidths are required. In FIG. 2(c), Ch21 and Ch24 are used, we need to apply a 6 MHz IEF for signals in Ch21 and then a 6 MHz IEF for signals in Ch24. Note that these two filters are different because their center frequencies are different. Thus, using non-contiguous channels together will require more filter operations and increase complexity.

The use of IEFs can be considered in two parts. First, TVWS devices need memory to store filter coefficients. Assume that each IEF is a real filter with 100 taps and each filter coefficient is represented by an 8-bit integer. Then, each filter consumes 100 bytes of memory. If there are 100 IEFs, only 10 k bytes are enough to store all filter coefficients which is relatively small storage in modern electrical devices. Another consideration is complexity. For contiguous cases, since only one IEF is used, the complexity is not increased. However, for non-contiguous cases, IEFs are used more than once and the complexity is increased. If a STA use multiple non-contiguous TV channels, provided that they are separated by less than or equal to 2 TV channels, the additional filter operation is one for all cases. The farther the allowed channel separation, the more filter operations are required.

2. OFDM with Fixed Subcarrier Spacing:

Two kinds of OFDM systems are used in 802.11 for variable channel bandwidth. One is OFDM with fixed subcarrier number (FCN). The other is OFDM with fixed subcarrier spacing (FCS) (802.11n). We propose using OFDM with fixed subcarrier spacing because it simplifies the partial reception process in a receiver. Simpler partial reception has several benefits, which will now be described.

Partial reception is an advantage embedded in the OFDM technique. Assume that an OFDM system uses N subcarriers. The time domain discrete signals are computed by inverse discrete Fourier transform (IFFT) operation given by $$x[n] = \frac{1}{N} \sum_{k=0}^{N-1} X[k] e^{j2\pi kn/N}. \tag{2-1}$$

where X[k] are transmitted data symbols. If we are interested in the first half of subcarriers (X[0], . . . , X[N/2−1]), we can apply a filter to x[n] to remove the second half of subcarriers (X[N/2], . . . , X[N−1]). This is equivalent to setting the second half of the subcarriers to zero. Let's denote $x_1[n]$ as the filtered discrete time signal then $$x_1[n] = \frac{1}{N} \sum_{k=0}^{N/2-1} X[k] e^{j2\pi kn/N}. \tag{2-2}$$

Decimate $x_1[n]$ by 2, we will have $$x_1[2n] = \frac{1}{2} \cdot \frac{1}{N/2} \sum_{k=0}^{N/2-1} X[k] e^{j2\pi kn/(N/2)}. \tag{2-3}$$

From (2-3), it is cleared that the first N/2 subcarriers can be recovered by performing an N/2-point IDFT operation on $x_1[2n]$. That is we can use a smaller size DFT to demodulate partial OFDM subcarriers. If an OFDM system uses 64 subcarriers for a 6 MHz TVC and 128 subcarriers for 2 TVCs and so on, i.e., OFDM with fixed subcarrier spacing, then we can select any single TVC and use a sampling frequency of ⅙ MHz to sample the signal and demodulate it by a 64-point FFT operation. However, if the subcarrier spacing is not fixed, different sampling frequencies have to be tried to perform partial reception. When an STA can easily demodulate the signal within one TVC regardless of the channel bandwidth of the transmitted signal, it is very helpful for the system designs of the initial link connection, coexistence, and slot time and IFS.

An access point may use multiple available TV channels. However, STAs do not have this information before a link connection is established. A STA needs to search for all possible channel combinations. It is complicated and inefficient. If OFDM with fixed subcarrier spacing is employed and the information about TVCs used is duplicated in each TV channel, a STA can obtain the information by decoding one of the used TVCs. This will significantly reduce the complexity of initial link connection processes.

When multiple 802.11 systems operate in the same area and use overlapped channels, they need to be able to receive RTS and CTS signals, as well as the frame length of packets of other STAs to perform virtual carrier sensing. It is easy for systems employing OFDM with fixed subcarrier spacing to satisfy this requirement. We can simply duplicate information in each TV channel so that an STA can receive it from any one of the used TVCs. For the same reason, OFDM with fixed subcarrier spacing will greatly simplify the design of coexistence schemes for heterogeneous systems in TVWS.

The time interval between frames is called the inter-frame space (IFS). If the current IEEE 802.11 PHY with fixed subcarrier number is used for variable channel bandwidth, the sizes of RTS, CTS and ACK signals will vary according to the channel bandwidth. Consequently, a slot time is different for systems with different channel bandwidths. It is also hard to define IFS values for different channel bandwidths.

Assume that the number of subcarriers in each TVC is $N_C$ and a TVC has a bandwidth B, then the subcarrier spacing is fixed to $B/N_C$. The FFT size N is determined by $$N = 2^{\lceil \log_2(C+2) \rceil} \times N_C \quad (2\text{-}4)$$

where C is the number of channels between the first and the last channels used. The output of the ceiling function $\lceil x \rceil$ is the smallest integer not less than x. For example, in FIG. 2(c), when Ch21 and Ch24 are used together, the transmitter will select an FFT size of $N_C \times 4$ and the $2N_C$ subcarriers in Ch22 and Ch23 will be virtual subcarriers. In FIG. 2(d), the same FFT size is used but only the $N_C$ subcarriers in Ch 22 are virtual subcarriers.

3. Use Edge Subcarriers in Contiguous Channels for Data Frames:

In IEEE 802.11 OFDM, only the central 52 subcarriers are used to reduce adjacent channel interference. However, there is no such need when contiguous channels are used. For example, in FIG. 2(b), if Ch23 and Ch24 are used, the virtual subcarriers between them can be changed to data subcarriers. In this case, an additional eleven subcarriers are gained and the spectrum efficiency is increased.

4. Bit Loading

From the FCC Second Report and Order of November 2008, fixed TV band devices (TVBDs) are not allowed to operate on first adjacent channels of a TV station. Personal portable devices will be allowed to operate on first adjacent channels of a TV station, subject to the power limitation of 40 milliwatts. Thus, when a TVWS device uses multiple TVCs, there may be different power constraints on each TVC. It is natural to have different modulation levels in each TVC according to particular power constraints. This idea is similar to bit loading which varies modulation levels according to the channel gains in each subcarrier.

5. 64-Subcarrier-Based OFDM PLCP Sublayer

In this section, we describe the physical layer convergence procedure (PLCP) sublayer based on an OFDM technique with fixed-subcarrier spacing. The subcarrier spacing is 6 MHz/64=93.75 kHz. That is we allocate 64 subcarriers in each available TVC.

Figure 3:
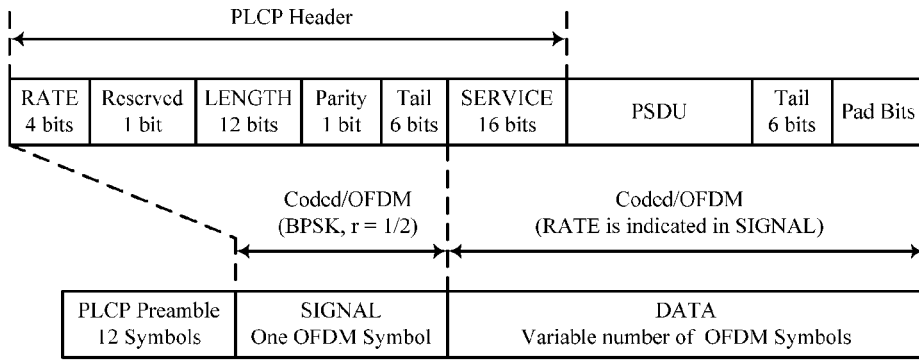
FIG. 3 shows a PPDU frame format.
Figure 3:
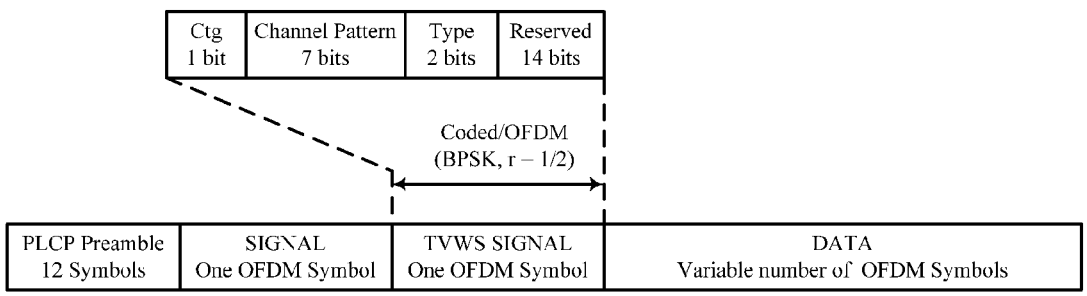

FIG. 3(a) shows the frame format for the PLCP protocol data unit (PPDU) used in the current 802.11 standard. The PPDU frame format includes the OFDM PLCP preamble, OFDM PLCP header, PLCP service data unit (PSDU), tail bits, and pad bits. In terms of OFDM symbols, the PPDU frame format consists of PLCP preamble, a SIGNAL OFDM preamble and DATA OFDM symbols. When 802.11 is used in TVWS, the proposal, under the principles described herein, is to add a TVWS SIGNAL OFDM symbol as shown in FIG. 3(b) to carry the TVWS parameters. The TVWS parameters include information such as center frequency and channel bandwidth which are required for STAs to receive signals. In the following sections, the details of PLCP preamble and subcarrier allocation are described for different situations.

In the first case, when only one TV channel is used, the PLCP sublayer should follow the OFDM PHY specified in clause 17 of IEEE 802.11 Standard of June 2007, except we add the TVWS SIGNAL OFDM symbol, as mentioned above.

In the case of multiple contiguous TV channels, the PLCP preamble consists of short training frames (STF) and long training frames (LTF). We propose extending the STF and LTF specified in clause 17 of IEEE 802.11 Standard of June 2007. The best way to illustrate the construction of STF and LTF is to consider the training sequence in each TV channel. Let $S_{m,n}$, $-32 \leq n \leq 32$ denote the short training sequence in the $m^{th}$ channel. If channels 20 to 23 are used, they are the $0^{th}$, $1^{st}$, $2^{nd}$ and $3^{rd}$ channel, respectively. The short training sequence $S_{0,-26-26}$ is the same as the short training sequence given in clause 17 of IEEE 802.11 Standard June 2007, $$S_{0,n} = \begin{cases} \sqrt{\left(\frac{13}{6}\right)} \times (1+j), & n = -24, -16, -4, 12, 16, 20, 24 \\ \sqrt{\left(\frac{13}{6}\right)} \times (-1-j), & n = -20, -12, -8, 4, 8 \\ 0, & \text{otherwise.} \end{cases} \quad (5\text{-}1)$$

The training sequences in another channel is given by $$S_{m,n} = S_{0,n} \times w(m)$$

where $w(m)$ is a sequence corresponding to a phase rotation in channel m. The phase rotation sequence is designed to reduce Peak-to-Average Power Ratio (PAPR). The values of $w(m)$ in 802.11n are $w(0)=1$ and $w(1)=j$ in the case of 40 MHz HT (high throughput)-mixed format, i.e., 2 20 MHz channels are combined to form a 40 MHz channel. The values of $w(m)$ for 4, 8 and 16 TVCs can be obtained through computer simulations. The construction of long training sequences in each channel is similar. Let $L_{m,n}$, $-32 \leq n \leq 32$ denote the long training sequence in the $m^{th}$ channel. The long training sequence $L_{0,-32-31}$ is the same as the long training sequence given in clause 17 of IEEE 802.11 Standard of June 2007, $L_{0,-32-31}=\{0, 0, 0, 0, 0, 0, 1, 1, -1, -1, 1, 1, -1, 1, -1, 1, 1, 1, 1, 1, 1, -1, -1, 1, 1, -1, 1, -1, 1, 1, 1, 1, 0, 1, -1, -1, 1, 1, -1, 1, -1, 1, -1, -1, -1, -1, -1, 1, 1, -1, -1, 1, -1, 1, -1, 1, 1, 1, 1, 0, 0, 0, 0, 0\}$ and $$L_{m,n} = L_{0,n} \times w(m).$$

Finally, the entire short training sequence $S_k$ and the long training sequence $L_k$ are given by $$S_{-\frac{N}{2}+32+64 \cdot m+n} = S_{m,n}$$

and $$L_{-\frac{N}{2}+32+64 \cdot m+n} = L_{m,n}.$$

Figure 4:
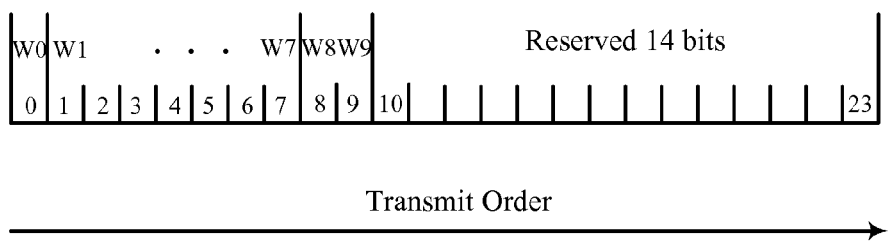
FIG. 4 shows TVWS SIGNAL field bit assignment.
Figure 5:
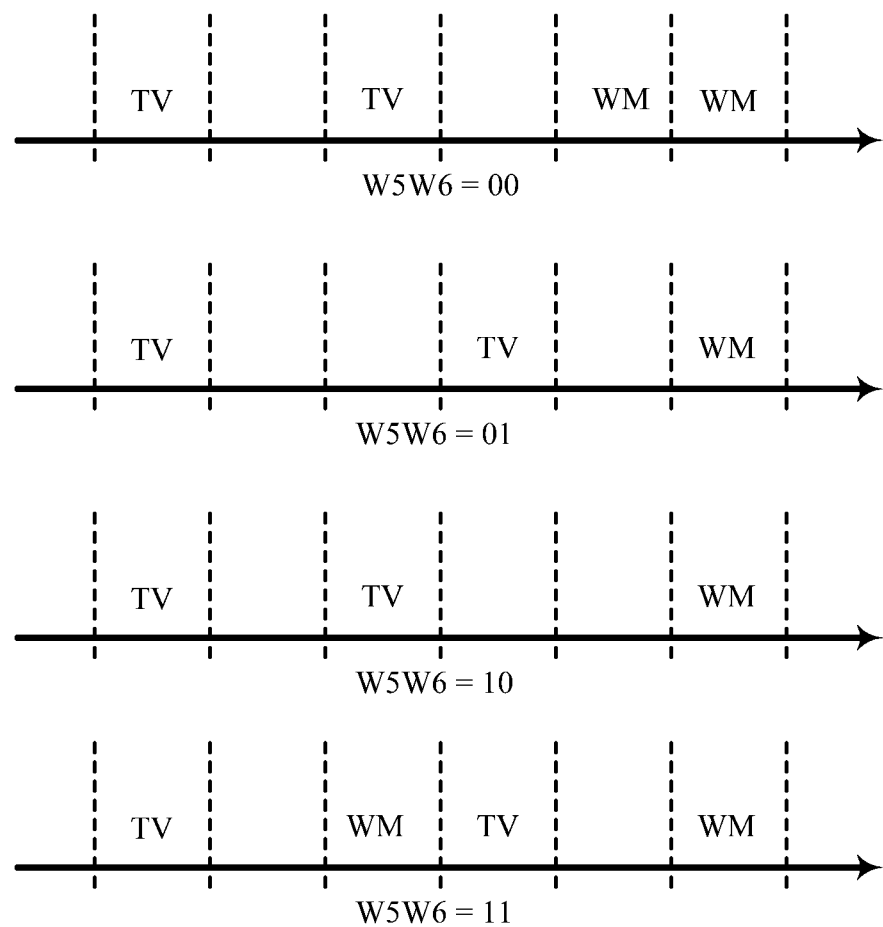
FIG. 5 shows channel patterns for using non-contiguous multiple TVCs.

Also in the case of multiple contiguous TV channels, FIG. 3(b) shows the TVWS parameters carried by the TVWS OFDM symbol. The first bit W0=1 indicates that continuous TVCs are used together. If W0=0, non-contiguous TVCs are used together. FIG. 4 shows the TVWS SIGNAL field bit assignment. W1, W2 and W3 are always used to represent the current channel number. When W0=1, W4 through W7 are used to represent the number of continuous TVCs used. When W0=0, W4 and W5 are used to represent the channel patterns as shown in FIG. 5. In the case of non-contiguous TVCs, W6 and W7 are reserved. W8 and W9 are used to represent frame type. There are three frame types, Regular (W8W9=00), Sensing (W8W9=01) and Coex (W8W9=10). The Regular type means that this is a regular 802.11 frame. The Sensing Type means that this frame is a broadcast signal indicating the length of the quiet period. The Coex Type is used by non-802.11 systems after obtaining the right to channel access to indicate to other STAs the length of its TXOP. Note that the Sensing and Coex frames will not contain DATA OFDM symbol.

The information carried by two SIGNAL OFDM symbols is duplicated in each TV channel. Thus, an STA can receive the information in these two SIGNAL OFDM symbols by demodulating one TVC. The construction for these two SIGNAL OFDM symbols is the same as the SIGNAL OFDM symbol specified in clause 17 of IEEE 802.11 Standard of June 2007, that is, BPSK modulation with a 1/2-convolutional coding is used. After the 64 subcarriers, for example $D_{0,-32-31}$, which will be put in the first TVC, similar to the construction of STF and LTF, the subcarriers in the other TVCs are given by $$D_{m,n} = D_{0,n} \times w(m).$$

The whole symbol is given by $$D_{-\frac{N}{2}+32+64 \cdot m+n} = D_{m,n}.$$

Also in the case of multiple contiguous TV channels, the information carried in the SIGNAL OFDM symbols duplicates in each TVC so that an STA can obtain the information by partially receiving one TVC. Note that for the RTS and CTS signals, the information is contained in the DATA OFDM symbols. The edge subcarriers are thus unused. For the DATA OFDM symbols, the edge subcarriers should be used to increase data rate.

For the case of multiple non-contiguous TV channels, the construction of the PLCP preamble and SIGNAL OFDM symbols for multiple non-contiguous TVCs is the same as that of the multiple contiguous TVCs except that virtual subcarriers are used in the unused channel. For example, in FIG. 2(b), channel 21 and channel 23 are used together. From (2-4), the FFT size is 4×64=256. Then, channel 21 and 23 are the $0^{th}$ and $2^{nd}$ channel. The PLCP preamble and SIGNAL OFDM symbols are constructed by the steps described above for PLCP preamble and SIGNAL OFDM symbols for 4 contiguous TVCs but virtual subcarriers are put in the $1^{st}$ and $3^{rd}$ channels.

One or more implementations have been described that use a motion-based object segmentation method that separates locally moving objects from a globally moving background. The implementations compute and refine a foreground mask for each frame in four different stages involving frame alignment, pixel alignment, consensus filtering and spatio-temporal refinement. The method and apparatus described introduces less artifacts and preserves more background detail than existing video object segmentation methods.

Figure 6:
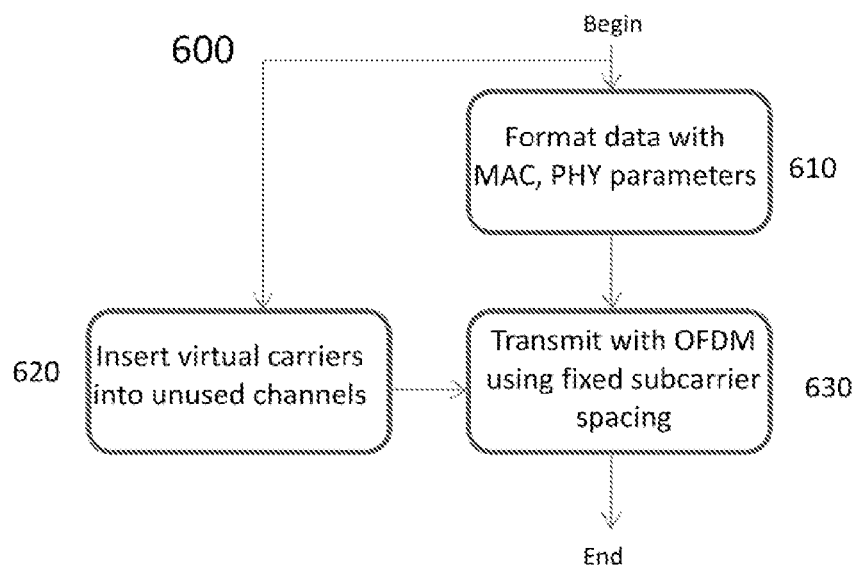
FIG. 6 shows one embodiment of a method using the present principles.

One embodiment of the present principles is illustrated in FIG. 6, which shows a method 600 for generating and transmitting a signal in TV white space using the present principles. Data to be transmitted by way of a TV white space is formatted along with medium access control (MAC) and physical layer (PHY) parameters in step 610 into information suitable for transmission within localized wireless networks. Virtual carriers are generated, when needed, in step 620 to be sent in unused channels if the TV white space being employed is comprised of multiple non-contiguous channels. Transmission of OFDM symbols with fixed subcarrier spacing, representative of the formatted data, within one or more TV white space channels is performed in step 630, thereby enabling communication over a broader network.

Figure 7:
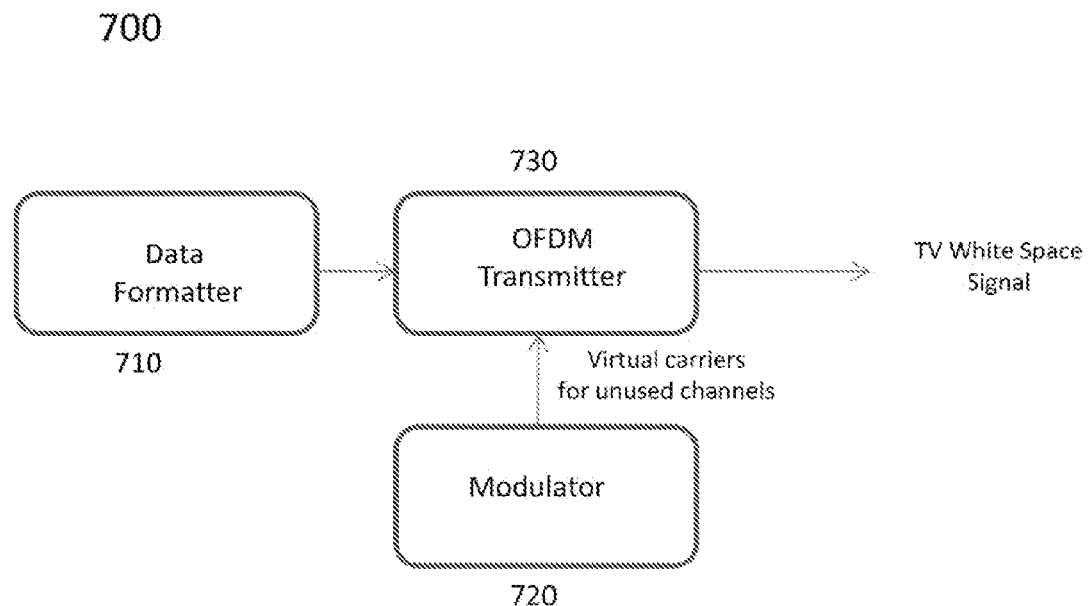
FIG. 7 shows one embodiment of an apparatus under the present principles.

Another embodiment of the present principles is illustrated in FIG. 7, which shows an apparatus 700 for generating a TV white space signal under the present principles. Data formatter 710 prepares data to be transmitted via TV white space. The formatter adds medium access control parameters as well as physical layer parameters to the data. The output of data formatter 710 is in signal communication with a first input of OFDM transmitter 730. A second input of OFDM transmitter 730 is the output of modulator 720, that inserts virtual carriers into unused TV white space channels. Unused TV channels are inserted with virtual carriers when, for example, multiple non-contiguous TV channels are used for the TV white space transmission. OFDM transmitter 730 transmits the information from data formatter 710 using Orthogonal Frequency Division Multiplexing with fixed subcarrier spacing, and passes any virtual carriers that have been inserted into unused TV channels by modulator 720.

We thus provide one or more implementations having particular features and aspects. However, features and aspects of described implementations may also be adapted for other implementations.

For example, these implementations and features may be used in the context of coding video and/or coding other types of data. Additionally, these implementations and features may be used in the context of, or adapted for use in the context of, a standard. Several such standards are AVC, the extension of AVC for multi-view coding (MVC), the extension of AVC for scalable video coding (SVC), and the proposed MPEG/JVT standards for 3-D Video coding (3DV) and for High-Performance Video Coding (HVC), but other standards (existing or future) may be used. Of course, the implementations and features need not be used in a standard.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A description will now be given of the many attendant advantages and features of the present principles, some of which have been mentioned above. For example, one advantage of the present principles is a method to generate a TV white space signal, suitable for use in 802.11 WiFi applications. The method is comprised of formatting of data with MAC and PHY parameters, suitable for transmission over TV white space for WiFi applications. The method is further comprised of inserting virtual carriers into unused TV channels if multiple non-contiguous TV white space channels are used. The method is further comprised of transmission of the formatted data using OFDM with fixed subcarrier spacing and passing of the virtual carriers in the unused TV white space channels. Another advantage is the aforementioned method, with a TVWS SIGNAL orthogonal frequency division multiplexing symbol added to convey TV white space parameters. Yet another advantage is the aforementioned method, wherein short training frames and long training frames in a physical layer convergence procedure preamble are extended to enable operation in multiple contiguous TV channels. Yet another advantage is the aforementioned method, wherein there is an access category for spectrum sensing in an enhanced distributed channel access physical layer. Yet a further advantage is giving the aforementioned access category the highest priority for access.

A further advantage of the present principles is an apparatus for generating a TV white space signal comprising a data formatter, a transmitter and a modulator. The data formatter arranges data with MAC and PHY parameters suitable for use in 802.11 applications. The modulator inserts virtual carriers when there are unused TV channels, such as when there are multiple non-contiguous TV white space channels used. The transmitter uses OFDM to transmit the data and pass along any virtual carriers. A further advantage is the aforementioned apparatus, with a TVWS SIGNAL orthogonal frequency division multiplexing symbol added before transmission to convey TV white space parameters. Yet another advantage is the aforementioned apparatus, wherein short training frames and long training frames in a physical layer convergence procedure preamble are extended by the data formatter to enable operation in multiple contiguous TV channels. Yet another advantage is the aforementioned apparatus, wherein there is an access category for spectrum sensing in an enhanced distributed channel access physical layer. Yet a further advantage is giving the aforementioned access category the highest priority for access.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. A method for generating and transmitting a signal in TV white space, comprising:
   formatting data, together with medium access control and physical layer parameters, into a format compliant with a standard suitable for transmission within localized wireless networks;
   transmitting said formatted data using orthogonal frequency division multiplexing with fixed subcarrier spacing, within one or more TV white space channels, thereby enabling communication over a wide area network, wherein virtual carriers containing no data are inserted into any TV channels occupying spectrum between non-contiguous TV white space channels, spaced such that there are no more than two TV channels in between portions of said non-contiguous TV white space channel.

2. The method of claim 1, wherein a TVWS SIGNAL orthogonal frequency division multiplexing symbol is added to convey TV white space parameters.

3. The method of claim 1, wherein short training frames and long training frames in a physical layer convergence procedure preamble are extended.

4. The method of claim 1, wherein the transmitted signal complies with at least one 802.11 standard.

5. The method of claim 1, wherein there is an access category for spectrum sensing in an enhanced distributed channel access physical layer.

6. The method of claim 5, wherein the access category for spectrum sensing has highest priority.

7. An apparatus for generating and transmitting a signal in TV white space, comprising:
- a data formatter that formats data, together with medium access control and physical layer parameters, into information suitable for transmission within localized wireless networks;
- a transmitter that transmits said information using orthogonal frequency division multiplexing with fixed subcarrier spacing, within one or more TV white space channels, thereby enabling communication over a wide area network, wherein virtual carriers containing no data are inserted into any TV channels occupying spectrum between non-contiguous TV white space channels, spaced such that there are no more than two TV channels in between portions of said non-contiguous TV white space channel.

8. The apparatus of claim 7, wherein said transmitter adds a TVWS SIGNAL orthogonal frequency division multiplexing symbol to convey TV white space parameters.

9. The apparatus of claim 7, wherein said formatter extends short training frames and long training frames in a physical layer convergence procedure preamble.

10. The apparatus of claim 7, wherein the transmitted signal complies with at least one 802.11 standard.

11. The apparatus of claim 7, wherein said data formatter uses an access category for spectrum sensing in an enhanced distributed channel access physical layer.

12. The apparatus of claim 11, wherein the access category for spectrum sensing has highest priority.

\* \* \* \* \*